Figure 1:
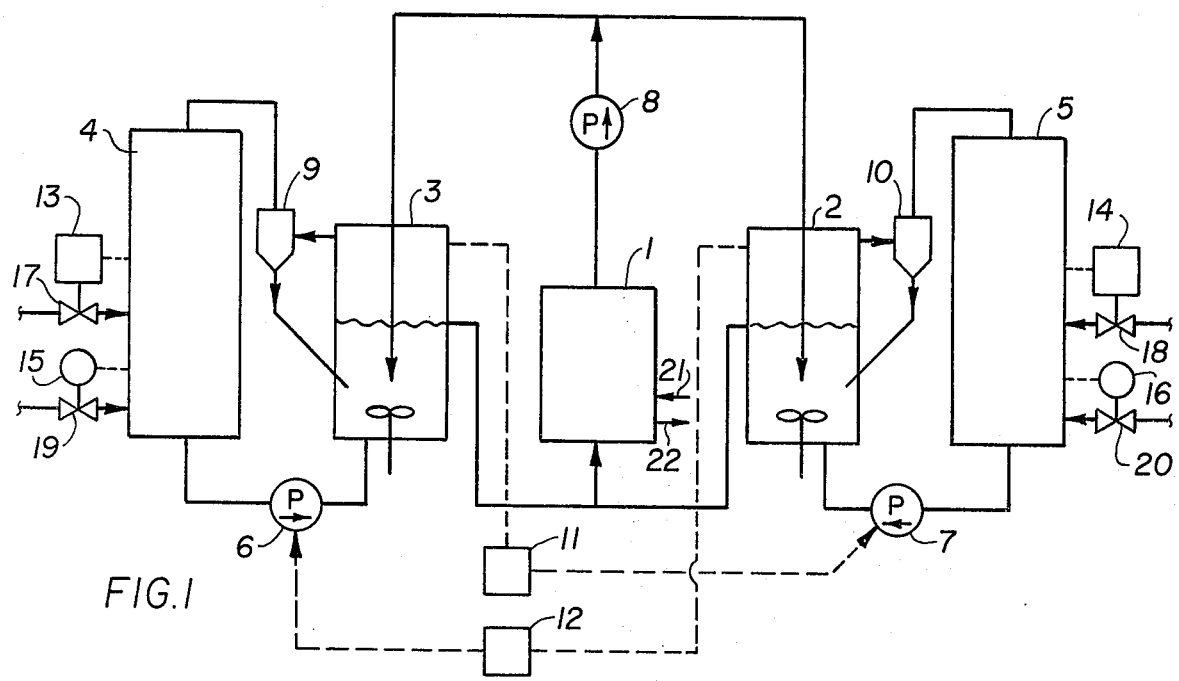

United States Patent [19]
Ishizaki et al.

[11] 3,888,740
[45] June 10, 1975

[54] METHOD FOR CULTURING HYDROGEN OXIDIZING BACTERIUM

[75] Inventors: Ayaaki Ishizaki, Kawasaki; Yasushi Morinaga; Hiroyuki Sakakibara, both of Yokohama; Masao Horiuchi, Kawasaki, all of Japan

[73] Assignee: Ajinomoto Co., Inc., Tokyo, Japan

[22] Filed: Aug. 28, 1974

[21] Appl. No.: 501,136

[30] Foreign Application Priority Data
Sept. 5, 1973  Japan.............................. 48-99908

[52] U.S. Cl. .................... 195/109; 195/142; 195/96
[51] Int. Cl................................................ C12b 1/14
[58] Field of Search..................................... 195/109

[56] References Cited
UNITED STATES PATENTS
3,711,372  1/1973  Donnelly........................... 195/109

Primary Examiner—Alvin E. Tanenholtz
Attorney, Agent, or Firm—Hans Berman; Kurt Kelman

[57] ABSTRACT

Two portions of a culture medium supporting a hydrogen oxidizing bacterium are circulated separately and continuously between a sealed tank filled with the medium and two enriching stations in which the medium is brought into intimate contact with gases mainly consisting of hydrogen and oxygen respectively. The rate of dissolution of the two contacting gases is controlled so as to prevent formation of explosive hydrogen-oxygen mixtures at the two stations. Carbon dioxide necessary for the growth of the bacterium is admixed to the gases at both stations.

5 Claims, 2 Drawing Figures

METHOD FOR CULTURING HYDROGEN OXIDIZING BACTERIUM

This invention relates to a method of culturing hydrogen oxidizing bacteria.

Hydrogen oxidizing bacteria grow autotrophically by oxidizing hydrogen and assimilating carbon dioxide as the carbon source. Their cells are useful as animal feeds. However, they are difficult to cultivate because they grow best in an explosive gaseous mixture of oxygen and hydrogen, and they utilize these gases at low efficiency because of the low solubility of the gases in agueous media.

In an atmosphere outside the explosive limits, the growth rate of the bacteria is low, and oxygen and hydrogen gas are utilized at even lower efficiency. When utilization is to be improved by circulating the partly utilized gases, the danger of explosion is increased.

It has now been found that the formation of an explosive gas mixture may be avoided without reducing the efficiency at which the gases are utilized by circulating the liquid culture medium between the fermentation vessel and two enriching stations through respective separate circulating lines, the medium being enriched in a first station with dissolved hydrogen and in the second station with dissolved oxygen, and by combining the two enriched portions in the fermentation vessel.

Hydrogen gas is dissolved at the fist station in such an amount as to hold the relative concentration of hydrogen gas in the oxygen at the second station below the explosive limit, and similarly, only enough oxygen gas is dissolved in the culture medium at the second station to make the oxygen available at the first insufficient to form an explosive mixture with the hydrogen there.

The necessary carbon dioxide is dissolved in the culture medium during the cultivation.

A mixing tank or a line mixer may serve as the fermentation vessel and may be equipped with a pH meter for measuring the pH of the culture medium. Various gas-liquid contactors, such as a submerged fermenter, an air-lift fermenter, a spray tower, a falling film tower, a packed tower, an atomizer, a rotary disc contactor, or a line mixer may be employed at the enriching stations for oxygen and hydrogen gas.

The oxygen and hydrogen gas concentrations in the enriching stations are determined conventionally, as by gas chromatography. Since the circulating gas consists of hydrogen, oxygen, and carbon dioxide, the concentration of only two constituents needs to be determined. The concentrations of oxygen and hydrogen in the gas phase are proportional to the concentrations in the liquid phase at each station so that the gas composition can be determined by measuring the concentrations of the dissolved gases.

The limiting concentrations of hydrogen and oxygen in their explosive mixtures with carbon dioxide are known (Zabetakis "Flammability Characteristics of Combustible Gases and Vapors," Bur. Min. Bull. 627 [1965]). The rate at which hydrogen is dissolved in the culture medium at the hydrogen enriching station can be controlled by varying the hydrogen feeding rate, the rate of agitation, or the gas pressure. Oxygen dissolution is similarly controlled at the other enriching station.

Hydrogen oxidizing bacteria consume hydrogen, oxygen, and carbon dioxide in an approximate ratio of 4:1:1, and the three gases are preferably dissolved in the culture medium in the same ratio. The carbon dioxide may be introduced into the culture medium at any point in the system, as in the fermenter or with either the hydrogen or oxygen gas. Carbon dioxide is replenished at a level suitable for the growth of the bacterium at the same rate at which it is assimilated.

All known hydrogen oxidizing bacteria can be cultured by the method of this invention. They include:

| | |
|---|---|
| Hydrogenomonas eutropha (Alcaligenes eutrophus) | ATCC 17697 |
| Hydrogenomonas facilis (Pseudomonas facilis) | ATCC 11228 |
| Pseudomonas saccharophila | ATCC 15946 |
| Brevibacterium sp. | FERM-P 2234 |
| Mycobacterium sp. | FERM-P 2235 |
| Nocardia opaca | |
| Streptomyces autotrophica | |
| Micrococcus denitrificans | ATCC 19367 |

The aqueous culture medium is otherwise conventional and contains a nitrogen source (ammonium or nitrate ions) and inorganic ions (phosphate, potassium, magnesium, ferrous, manganese, sulfate, calcium, etc.). Bacterial growth is sometimes promoted by minor organic nutrients (vitamines, amino acids, purines).

The cultivation may be performed batchwise or preferably continuously at 20° to 40°C, the pH being held at 4 to 9 by mixing preferably with gaseous or aqueous ammonia.

Figure 2:
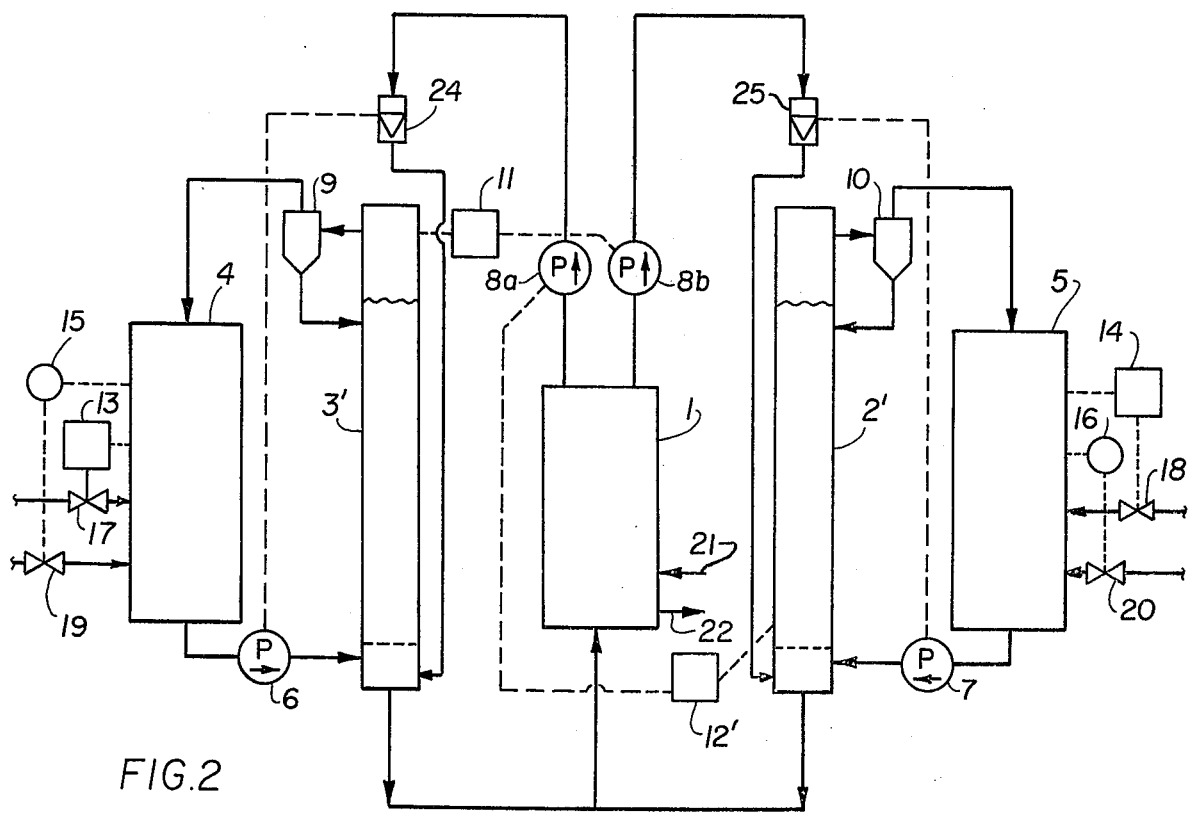

FIGS. 1 and 2 of the attached drawing diagrammatically illustrate apparatus for performing the method of the invention.

FIG. 1 shows a sealed mixing tank 1 equipped with an inlet 21 and an outlet 22 for culture medium. A liquid circulating pump 8 connects the vessel 1 with two Waldhof agitator vessels 2, 3. An oxygen reservoir 4 is connected with the vessel 3 by a gas circulating pump 6 and by a gas line equipped with a liquid separator 9. Gas drawn from the vessel 3 is stripped of entrained liquid in the separator. The liquid is returned to the vessel 3 while the gas passes through the reservoir 4 and is dispersed by the pump 6 in the liquid zone of the vessel 3.

The hydrogen concentration in the vessel 3 is monitored by a gas chromatograph 11, and the oxygen concentration in the gas returned to the vessel 3 from the reservoir 4 by a chromatograph 12. A pressure gage 15 operates an oxygen feed valve 19 leading to the reservoir 4. An infrared $CO_2$ analyzer 13 operates a carbon dioxide supply valve 17 in response to the $CO_2$ concentration in the reservoir 4.

Gas is circulated in an analogous manner between the agitator vessel 2 and a hydrogen reservoir 5 by a pump 7 and through a separator 10, the hydrogen concentration in the circulated gas being measured by the chromatograph 11 and the oxygen concentration in the agitator vessel 2 by the chromatograph 12. The hydrogen pressure in the reservoir 5 is maintained by a pressure gage 16 acting on a control valve 20, carbon dioxide being fed to the reservoir 5 through a supply valve 18 controlled by an infrared carbon dioxide analyzer 14.

In a specific embodiment, the mixing tank 1 had a diameter of 0.3 m, a height of 0.6 m, and a capacity of 40 liters. The vessels 2, 3 each had a diameter of 0.4 m, a height of one meter, and a capacity of 100 liters. The reservoirs 4, 5 had each a capacity of 100 liters.

Gas pressures of 0.7 kg/cm² were maintained in the reservoirs 4, 5, and the carbon dioxide concentration was held at 5 percent. All gases were introduced into the system through non-illustrated ceramic filters to exclude microorganisms.

The pump 6 was operated at a speed to maintain an oxygen concentration of 4 percent in the gas circulated by the pump 6, as determined by the chromatograph 12, and a hydrogen concentration of 2 percent in the gas circulated by the pump 7 was similarly maintained by controlling the circulation rate, as determined by the chromatograph 11.

The tank 1 was filled to capacity with an aqueous medium containing, per liter, 1 g $(NH_4)_2SO_4$, 1.0 g $KH_2PO_4$, 0.2 g $MgSO_4 \cdot 7H_2O$, 5 mg ferric ammonium citrate, and 4 mg $CaSO_4$, and adjusted with NaOH to pH 7.0. The vessel 2 received 60 liters of the same medium and hydrogen gas containing 5 percent carbon dioxide, while the vessel 3 was charged with 60 l culture medium and oxygen gas containing 5 percent carbon dioxide.

The medium was circulated at a rate of 1 m³/hr. through each vessel 2, 3, stirred in vessel 2 at 250 r.p.m. and in vessel 3 at 140 r.p.m.

The medium was inoculated with Hydrogenomonas eutropha ATCC 17697, and the culture was maintained at 30°C. The cell concentration was 1.15 g/l after 18 hours, and the medium thereafter was replaced continuously at a rate of 20 percent per hour through the inlet 21 and outlet 22. The cells reached a steady concentration of 1.5 g/l after 72 hours cultivation. At this stage, the gas circulated between the reservoir 5 and the vessel 2 at a rate of 100 liters/minute contained 91.0% hydrogen, 4% oxygen, and 5% carbon dioxide. The gas circulated between the reservoir 4 and the vessel 3 at a rate of 85 liters per minute consisted of 93% oxygen, 2% hydrogen, and 5% carbon dioxide.

In the modified apparatus shown in FIG. 2, the liquid culture medium is circulated between a sealed mixing tank 1 and two bubble plate towers 2', 3' by two pumps 8a, 8b, while a gas mixture rich in oxygen is circulated between the column 3' and a reservoir 4 by a gas circulating pump 6. A pump 7 similarly circulates a hydrogen-rich gas between the column 2' and a reservoir 5, the gases leaving the columns being stripped of entrained liquids in separators 9, 10 respectively. Hydrogen in the gas space of the column 3' and the liquid medium returned to the tank 1 is measured by a gas chromatograph 11, and oxygen in the liquid entering the tank 1 through the pump 8a and in the liquid in the column 2' is measured by an oxygen analyzer 12'. Carbon dioxide analyzers 13, 14, pressure gages 15, 16, and control valves 17-20 are associated with the reservoirs 4, 5 as described with reference to FIG. 1. Culture medium may be admitted to and discharged from the tank 1 through an inlet 21 and an outlet 22. Flow meters 23, 24 in the discharge lines of the liquid pumps 8a, 8b control the gas circulating pumps 6, 7.

In a specific embodiment, the tank 1 had a capacity of 100 liters (0.4 m dia. × 0.8 m high), the columns 2', 3' had capacities of 150 liters each (0.2 m dia. × 5 m high). The hydrogen reservoir 5 was initially filed with hydrogen containing 5% carbon dioxide at 0.7 kg/cm², and the oxygen reservoir 4 with oxygen containing 5% carbon dioxide at the same pressure. The gases were circulated through the columns by the pumps 6, 7 at a rate of one volume gas per five volumes of circulated medium. The liquid flow rate through the column 2' was controlled to maintain a hydrogen concentration of 2 percent in the column 3', and the liquid circulation rate through the column 3' was controlled to maintain the oxygen concentration in the column 2' at 4 percent.

Hydrogenomonas eutropha ATCC 17697 was cultured on the medium as described with reference to FIG. 1. After 25 hours, the cell concentration in the medium reached 1.35 g/l, and the medium in the tank 1 thereafter was replaced by fresh medium through the inlet 21 and the outlet 22 at a rate of 15 percent per hour. A steady cell concentration of 1.75 g (dry weight) per liter was reached after 60 hours of cultivation.

At this stage, the circulation rate of the culture medium through the column 2' was 12 m³/hr., and the circulation rate through the column 3' was 5 m³/hr. The hydrogen enriched gas was circulated at a rate of 2.4 m³/hr. and the oxygen enriched gas at 1.0 m³/hr. The gas in the reservoir 5 consisted of 91 percent hydrogen, 4% oxygen, and 5% carbon dioxide. The gas in the reservoir 4 consisted of 93% oxygen, 2% hydrogen, and 5% carbon dioxide.

What is claimed is:

1. A method of culturing a hydrogen oxidizing bacterium which comprises:
   a. inoculating an aqueous culture medium with said bacterium;
   b. circulating a first portion of said medium between a container and a first enriching station;
   c. circulating a second portion of said medium separate from said first portion between said container and a second enriching station;
   d. dissolving hydrogen gas in said first portion at said first station;
   e. dissolving oxygen gas in said second portion at said second station at a rate to keep the concentration of oxygen gas in the hydrogen gas at said first station below the explosive limit of the gas mixture at said first station,
      1. the hydrogen gas being dissolved in said medium at said first station at a rate to keep the concentration of hydrogen gas in the oxygen gas at said second station below the explosive limit of the gas mixture at said second station;
   f. mixing said first and second portions respectively enriched with dissolved hydrogen and oxygen in said container; and
   g. maintaining in said medium a concentration of dissolved carbon dioxide sufficient for maintaining the growth of said bacterium.

2. A method as set forth in claim 1, wherein the concentration of hydrogen gas at said second station is controlled by varying the rate of circulation of said medium through said first station.

3. A method as set forth in claim 1, wherein the concentration of hydrogen gas at said second station is controlled by varying the rate of supply of hydrogen gas to said first station.

4. A method as set forth in claim 1, wherein the concentration of oxygen gas at said first station is controlled by varying the rate of circulation of said medium through said second station.

5. A method as set forth in claim 1, wherein the concentration of oxygen gas at said first station is controlled by varying the rate of supply of oxygen gas to said second station.

* * * * *